United States Patent
Fodor et al.

(10) Patent No.: US 10,056,954 B2
(45) Date of Patent: Aug. 21, 2018

(54) WIRELESS DEVICE, RADIO NETWORK NODE, METHODS PERFORMED THEREIN

(71) Applicant: Telefonaktiebolaget L M Ericsson (publ), Stockholm (SE)

(72) Inventors: Gabor Fodor, Hässelby (SE); Reza Moosavi, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 192 days.

(21) Appl. No.: 14/763,291

(22) PCT Filed: Jul. 3, 2015

(86) PCT No.: PCT/SE2015/050789
§ 371 (c)(1),
(2) Date: Jul. 24, 2015

(87) PCT Pub. No.: WO2017/007377
PCT Pub. Date: Jan. 12, 2017

(65) Prior Publication Data
US 2017/0141823 A1    May 18, 2017

(51) Int. Cl.
| | |
|---|---|
| *H04B 7/0456* | (2017.01) |
| *H04B 7/0404* | (2017.01) |
| *H04W 72/04* | (2009.01) |
| *H04B 7/06* | (2006.01) |
| *H04L 5/00* | (2006.01) |
| *H04W 4/02* | (2018.01) |

(52) U.S. Cl.
CPC ......... *H04B 7/0456* (2013.01); *H04B 7/0404* (2013.01); *H04B 7/0617* (2013.01); *H04L 5/005* (2013.01); *H04W 4/025* (2013.01); *H04W 72/042* (2013.01)

(58) Field of Classification Search
CPC .. H04B 7/0617; H04B 7/0413; H04B 7/0417; H04B 7/0456; H04B 7/063; H04W 72/0413
See application file for complete search history.

(56) References Cited

U.S. PATENT DOCUMENTS

| 2012/0014349 A1 | 1/2012 | Chung et al. |
| 2012/0120997 A1* | 5/2012 | Park .................... H04B 7/0413 375/224 |

(Continued)

FOREIGN PATENT DOCUMENTS

WO    2014065850 A1    5/2014

OTHER PUBLICATIONS

Unknown Author, "Sounding capacity enhancement using DMRS", 3GPP TSG RAN WG 1 meeting #60bis R1-101970 Beijing, Apr. 10-17, 2010 Source: Huawei, Apr. 10-17, 2010, 1-6.

*Primary Examiner* — David S Huang
(74) *Attorney, Agent, or Firm* — Murphy, Bilak & Homiller, PLLC

(57) ABSTRACT

Embodiments herein relate to a method performed by a wireless device (10) for transmitting uplink reference signal to a radio network node in a wireless communication network. The wireless device (10) determines to beamform a transmission of an uplink reference signal for channel estimation when a condition is fulfilled. The wireless device (10) transmits the uplink reference signal to the radio network node (12) in a beamformed manner when the condition is fulfilled.

16 Claims, 13 Drawing Sheets

(56) References Cited

U.S. PATENT DOCUMENTS

2012/0250742 A1 10/2012 Tiirola et al.
2013/0322280 A1* 12/2013 Pi ..................... H04W 72/0413
                                                                370/252
2014/0219376 A1 8/2014 Park et al.

* cited by examiner

WIRELESS DEVICE, RADIO NETWORK NODE, METHODS PERFORMED THEREIN

TECHNICAL FIELD

Embodiments herein relate to a wireless device, a radio network node and methods performed therein regarding wireless communication. In particular, embodiments herein relate to transmissions of an uplink reference signal from a wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into areas or cell areas, with each area or cell area being served by an access node e.g., a Wi-Fi access point or a radio base station (RBS), which in some networks may also be called, for example, a "NodeB" or "eNodeB". The area or cell area is a geographical area where radio coverage is provided by the access node. The access node communicates over an air interface operating on radio frequencies with the wireless device within range of the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the radio base station nodes are directly connected to the EPC core network. As such, the Radio Access Network (RAN) of an EPS has an essentially "flat" architecture comprising radio base stations connected directly to one or more core networks.

Due to recent technology and standardization developments, introducing large antenna arrays at cellular base stations and other wireless access points has become a viable option to boost the capacity and user data rates in the wireless communication network. A base station (BS) or an access point (AP) equipped with excessive number of antennas, can simultaneously schedule multiple wireless devices at the same time or frequency band with simple linear processing such as maximum-ratio transmission (MRT) or zero-forcing (ZF) in a downlink (DL) and maximum-ratio combining (MRC) or ZF in an uplink (UL). This is often referred to as very-large, or full dimension (FD), multiple-input multiple-output (VL-MIMO) or massive MIMO in the literature. The gains with VL-MIMO are achieved without consuming any additional spectrum. Additionally, the radiated energy efficiency with VL-MIMO can be substantially improved. Recognizing the technology potential, the 3GPP has defined a work item on Full Dimension (FD) MIMO.

A key usage of FD MIMO technology is extreme narrow beam forming for DL transmissions, that enables a BS to focus the transmitted energy to the desired wireless device and thereby boosting the coverage and user data rates for DL transmissions.

For FD MIMO systems it is not trivial how to acquire Channel State Information (CSI) in a scalable fashion, which is essential to gain the performance potentials of excessive amount of transmit antennas. Traditionally, each wireless device continuously measures on pilot, or reference, symbols transmitted by the BS during downlink transmission phase, to estimate the downlink channel gain and feeds it back to the BS via a reverse link.

Since the number of required pilots in the downlink is proportional to the number of BS antennas, feedback based schemes are not scalable. Existing solutions to this problem operate in the time-division duplex (TDD) mode and rely on the channel reciprocity between the uplink and the downlink. More precisely, each wireless device transmits sounding reference signals (SRS) in the uplink phase which are then used by the BS to estimate both the uplink and downlink wireless channel. The number of uplink pilots in these schemes is proportional to the number of wireless devices, which are typically smaller than the number of BS antennas.

In existing systems, wireless channel sounding, also called wideband channel sounding, refers to the mechanism that enables an access point or BS to obtain wideband channel state information in parts of the spectrum, in which currently no wireless data transmission is taking place. Specifically, in cellular systems, a BS has two main usages of wideband channel sounding:

To acquire UL channel state information in frequency and time resources in which a wireless device is currently not scheduled, even though the wireless device may currently use other parts of the spectrum;

To acquire UL channel state information of wireless devices that are currently not transmitting uplink data.

Licensed Assisted Access (LAA) and the standards development of LTE will enable to deploy LTE wireless access points and BSs operating in unlicensed or lightly licensed spectrum bands. In such deployments, the transmit power both at the BS side and the wireless device side will be confined to regulatory constraints, affecting the range of both the UL and DL transmissions.

In contrast to currently deployed cellular and wireless systems, in which CSI for DL transmission is obtained by feedback signaling of measurement on DL reference signals, in future full dimension and very large MIMO systems, such CSI information must be acquired based on UL reference signals transmitted by end user wireless devices. To ensure a high quality CSI estimate, uplink SRS transmissions by wireless devices need to be received with a sufficiently high Signal-to-Noise-Ratio (SNR) at the BS.

Given that the channel should be sounded sufficiently often with respect to the coherence time of the channel, over the entire frequency band, including possibly some unlicensed bands in case of LAA significant amount of energy needs to be radiated by each wireless device for the uplink reference or pilot transmissions, e.g. SRS transmissions. Since the wireless devices are typically battery-limited devices, channel sounding poses both a coverage and an energy efficiency problem for wireless devices, especially those that are in the cell edge.

Thus, there is a problem relating to energy inefficiency and coverage limitation of uplink channel sounding due to existing solutions in, e.g. VL MIMO, systems resulting in a limited or reduced performance of the wireless communication network.

SUMMARY

An object of embodiments herein is to provide a mechanism that improves performance of the wireless communication network.

According to an aspect the object is achieved by a method performed by a wireless device for transmitting uplink reference signal to a radio network node in a wireless communication network. The wireless device determines to beamform a transmission of an uplink reference signal for channel estimation when a condition is fulfilled. The wireless device further transmits the uplink reference signal to the radio network node in a beamformed manner when the condition is fulfilled.

According to an aspect the object is further achieved by providing a method performed by a radio network node for performing channel estimation of a channel from a wireless device in a wireless communication network. The radio network node determines to beamform a transmission of an uplink reference signal for channel estimation from the wireless device when a condition is fulfilled. The radio network node transmits an order to beamform the transmission of the uplink reference signal to the wireless device. The radio network node receives a beamformed uplink reference signal from the wireless device. The radio network node performs a channel estimation of a channel from the wireless device based on the received beamformed uplink reference signal.

According to yet another aspect the object is achieved by providing a wireless device for transmitting an uplink reference signal to a radio network node in a wireless communication network. The wireless device is configured to determine to beamform a transmission of an uplink reference signal for channel estimation when a condition is fulfilled. The wireless device is further configured to transmit the uplink reference signal to the radio network node in a beamformed manner when the condition is fulfilled.

According to still another aspect the object is achieved by providing a radio network node for performing channel estimation of a channel from a wireless device in a wireless communication network. The radio network node is configured to determine to beamform a transmission of an uplink reference signal for channel estimation from the wireless device when a condition is fulfilled. The radio network node is further configured to transmit an order to beamform the transmission of the uplink reference signal to the wireless device. The radio network node is further configured to receive a beamformed uplink reference signal from the wireless device. The radio network node is configured to perform a channel estimation of a channel from the wireless device based on the received beamformed uplink reference signal.

An advantage of embodiments of the claimed solution is that the wireless device will use uplink reference signals in an efficient manner for channel estimation since the wireless device or the radio network node will determine to beamform the transmission of the uplink reference signal when a condition is fulfilled. Thus, this results in a more reliable channel estimation for wireless devices having poor or limited channel conditions and this results in an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
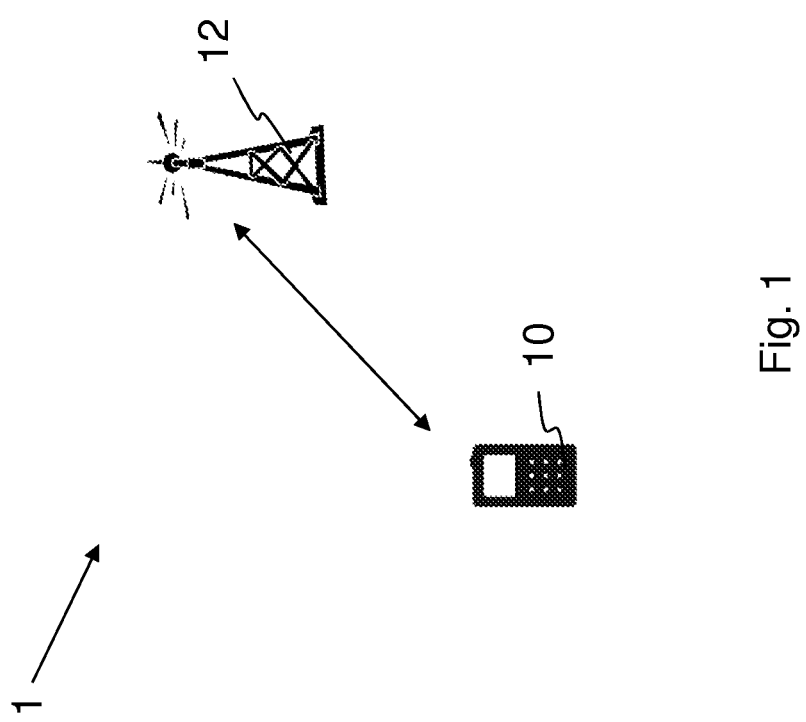
FIG. 1 is a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more core networks (CN). The wireless communication network 1 may use a number of different technologies, such as Wi-Fi, Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the wireless communication network 1, wireless devices e.g. a wireless device 10, such as a mobile station, non-Access Point Station (AP STA), STA, a user equipment and/or a wireless terminal, communicate via one or more Access Networks (AN), e.g. RAN, to one or more CNs. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 1 comprises a radio network node 12 providing radio coverage over a geographical area of a first radio access technology, such as Wi-Fi, LTE, WCDMA or similar. The radio network node 12 may be an Access Point (AP) such as a WLAN access point, Access Controller (AC), an AP STA, a stand-alone access point, access node, a base station, e.g. a radio base station such as a NodeB, an evolved Node B (eNB, eNode B), a base transceiver station, an Access Point Base Station, a base station router, or any other network unit capable of communicating with a wireless device within the area served by the radio network node 12 depending e.g. on the first radio access technology and terminology used.

As stated above, a problem is the energy inefficiency and coverage limitation of uplink channel sounding that results in a limited or reduced performance of the wireless communication network 1. This problem is exacerbated by the fact that for cell edge wireless devices the radio network node 12 may need to beamform DL transmissions in order to ensure acceptable cell edge data rates. Embodiments herein apply beamforming when transmitting uplink reference signals, such as SRSs, when the uplink reference signal is too weak without beamforming, e.g. that being the case for cell edge wireless devices or low power devices. To facilitate beamformed uplink reference signals embodiments herein have the further advantages:

- Embodiments herein determine when to trigger beamforming of the uplink reference signals for channel estimation, that is, under what conditions should the wireless device 10 start employing precoding techniques, i.e. beamforming, to increase the received uplink reference signal energy at the radio network node.
- Embodiments herein determine how to obtain an appropriate precoder for beamforming at the wireless device 10 such that the precoder used results in a sufficient received signal-to-noise ratio of the received uplink reference signal at the radio network node 12 when transmitting the uplink reference signal, e.g. during sounding reference signal in an LTE system. Thus, an appropriate precoder is used.

Embodiments herein solve energy inefficiency and coverage limitation of wideband uplink channel sounding with the two advantages listed above. More precisely, embodiments show how to trigger the beamforming of the UL reference signal transmission based on observing for instance a quality of uplink reference signal transmission and/or from other quality metrics. Furthermore, schemes are also disclosed herein for finding good precoders to be used by the wireless device 10 for sending the uplink reference signal in a beamformed manner. As the chosen precoder would be known at the radio network node 12 embodiments herein also have the advantage to do the channel estimation with beamformed signals. Note that not knowing the precoder used for channel sounding implies that the radio network node 12 estimates the effective channel after beamforming that is including the precoding matrix, which consequently affects the uplink-downlink reciprocity.

Embodiments herein enhance the uplink reference signal transmission by appropriately applying a precoder. Applying an appropriately chosen precoder would boost the received pilot signal energy at the radio network node 12. This would either increase the coverage region or help the wireless device 10 to reduce its transmitted power and consequently to save power which may be critical for battery-limited devices. The wireless device 10 may find the precoder to be used by the wireless device 10 in a collaborative manner with the radio network node 12 and hence the radio network node 12 would know the precoder used during the uplink reference signal transmission. Hence it will not affect the reciprocity based CSI acquisition that is necessary in e.g. VL-MIMO systems.

It is worth noting that while the main foreseen application for the proposed scheme may be in VL-MIMO systems, the proposed scheme may be applied in any system deploying uplink reference signal for channel estimation e.g. uplink channel sounding such as SRS transmission in LTE in order to enhance the uplink CSI acquisition.

Figure 2:
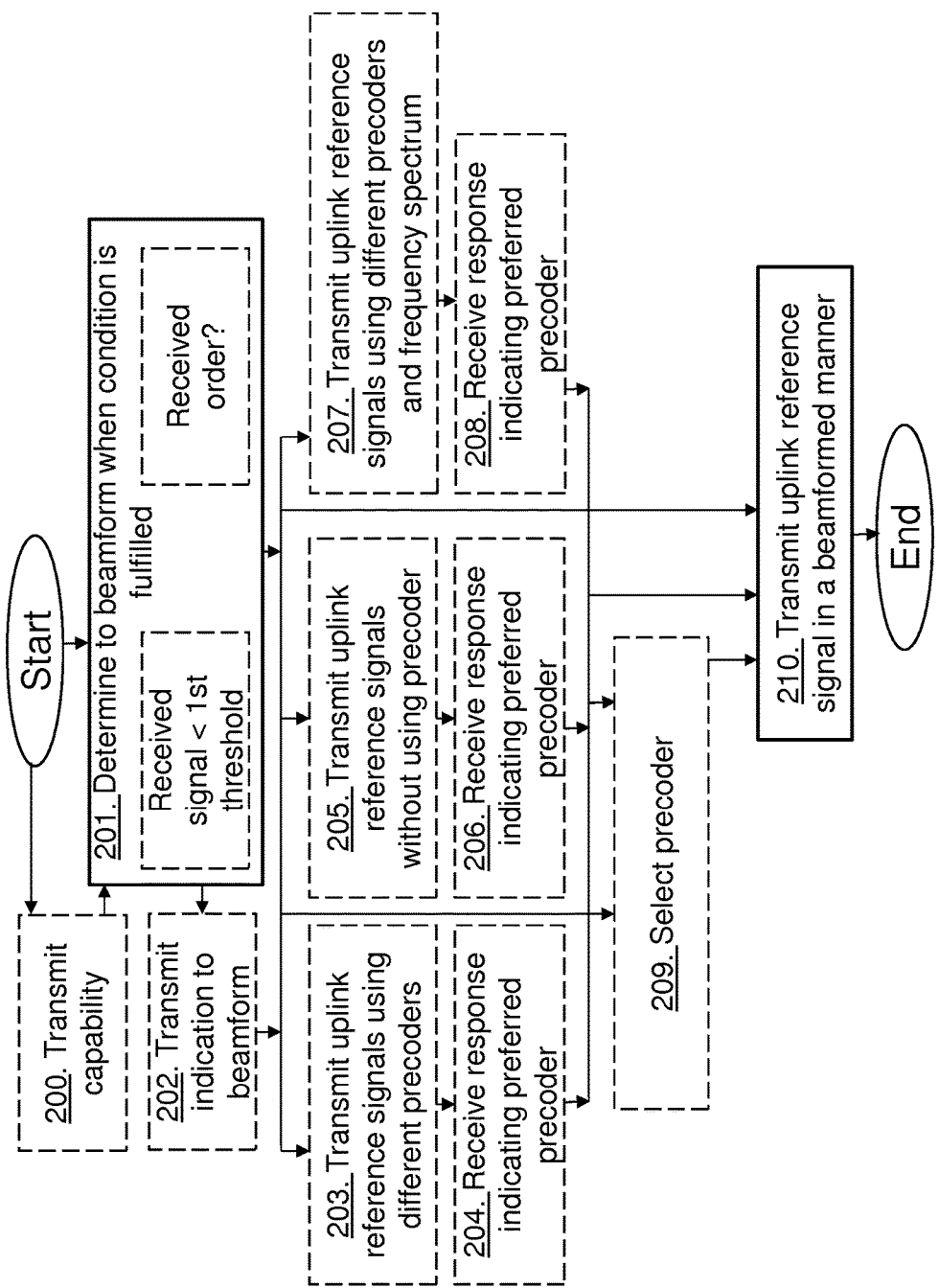
FIG. 2 is a schematic flowchart depicting a method performed by a wireless device according to embodiments herein.

The method actions performed by the wireless device 10 for transmitting uplink reference signals to the radio network node 12 in the wireless communication network 1 according to embodiments herein will now be described with reference to a flowchart depicted in FIG. 2. The actions do not have to be taken in the order stated below, but may be taken in any suitable order. Actions performed in some embodiments are marked with dashed boxes.

Action 200. The wireless device 10 may transmit to the radio network node 12 capability to beamform the uplink reference signal.

Action 201. The wireless device 10 determines to beamform a transmission of an uplink reference signal for channel estimation when a condition is fulfilled. The wireless device 10 may determine to beamform by comparing a received signal strength/quality of a received signal from the radio network node 12 with a first threshold for received signals. The condition defines that when the received signal strength/quality is below the first threshold for received signals the condition is fulfilled and it is determined to beamform the transmission. The received signal may be a synchronisation signal, a common reference signal and/or downlink payload. The wireless device 10 may determine to beamform by receiving an order from the radio network node 12 to beamform the uplink reference signal. The condition defines that when receiving said order the condition is fulfilled and it is determined to beamform the transmission.

Action 202. The wireless device 10 may transmit an indication to the radio network node 12 indicating that the wireless device 10 will beamform the uplink reference signal.

Action 203. The wireless device 10 may transmit the uplink reference signal a number of times using different precoders.

Action 204. The wireless device 10 may receive a response from the radio network node 12 indicating a preferred precoder out of the different precoders.

Action 205. The wireless device 10 may transmit the uplink reference signal without using a precoder.

Action 206. The wireless device 10 may receive a response from the radio network node 12 indicating a preferred precoder.

Action 207. The wireless device 10 may transmit the uplink reference signal a number of times using different precoders over different parts of a frequency spectrum.

Action 208. The wireless device 10 may receive a response from the radio network node 12 indicating a preferred precoder out of the different precoders.

Action 209. The wireless device 10 may select a precoder to beamform the uplink reference signal. The wireless device 10 may select precoder taking an additional information into account when selecting the precoder, e.g. precoder previously used, Angle of Arrival, precoder used as DMRS given that the wireless device 10 has active uplink session, or similar.

Action 210. The wireless device 10 transmits the uplink reference signal to the radio network node 12 in a beamformed manner when the condition is fulfilled. The wireless device 10 may use the selected precoder or the indicated preferred precoder to beamform the transmission.

Figure 3:
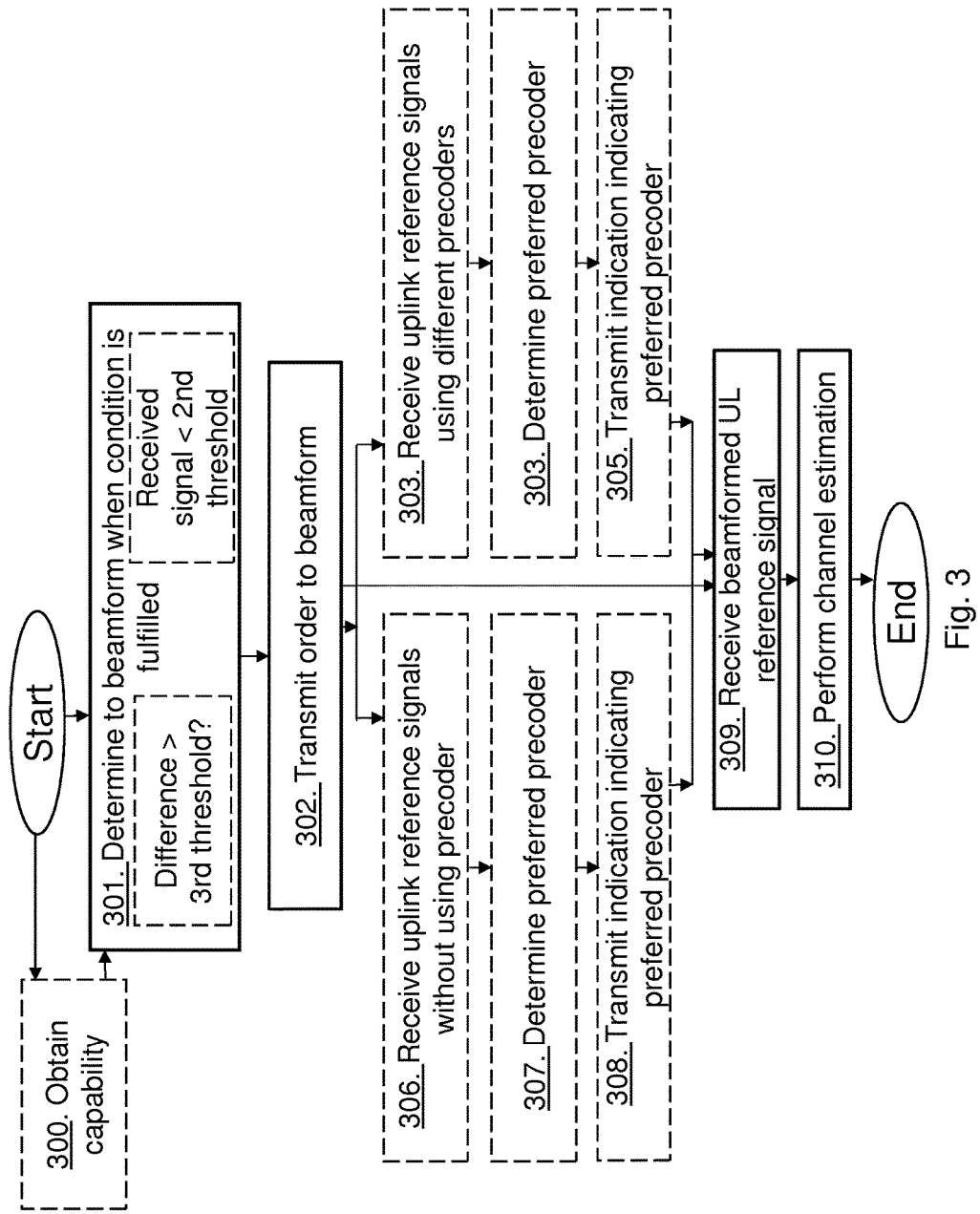
FIG. 3 is a schematic flowchart depicting a method performed by a radio network node according to embodiments herein.

The method actions performed by the radio network node 12 for performing a channel estimation of a channel from the wireless device 10 in the wireless communication network 1 according to embodiments herein will now be described with reference to a flowchart depicted in FIG. 3. The actions do not have to be taken in the order stated below, but may be taken in any suitable order. Actions performed in some embodiments are marked with dashed boxes.

Action 300. The radio network node 12 may obtain capability of the wireless device 10 associated with use of precoders. The capability may be obtained from within the radio network node 12 e.g. from a memory, received from the wireless device 10 and/or from another network node such as a core network node or similar.

Action 301. The radio network node 12 determines to beamform a transmission of an uplink reference signal for channel estimation from the wireless device 10 when a condition is fulfilled. The radio network node 12 may determine to beamform by comparing a received signal strength/quality of a received signal from the wireless device 10 with a second threshold for received signals. The condition defines that when the received signal strength/quality is below the second threshold for received signals the condition is fulfilled and it is determined to beamform the transmission. The received signal may be a sounding reference signal, an uplink reference signal, a demodulation reference signal, and/or uplink payload. The radio network node 12 may determine to beamform by comparing a received signal strength of a sounding reference signal from the wireless device 10 with a received signal strength of a demodulation reference signal. The condition defines that when a difference of the received signal strength of the sounding reference signal and the received signal strength of a demodulation reference signal is above a third threshold the condition is fulfilled and it is determined to beamform the transmission. The radio network node 12 may further take location of the wireless device 10 into account when determining to beamform the transmission (or not). Furthermore, the radio network node 12 may take the obtained capability, action 300, into account when determining to beamform the transmission. In some embodiments the radio network node 12 may receive an indication from the wireless device 10 indicating that the wireless device 10 will beamform the uplink reference signal. The condition defines that when receiving said indication it is determined to beamform the transmission.

Action 302. The radio network node 12 transmits an order e.g. an indication, to beamform the transmission of the uplink reference signal to the wireless device 10. This may be the order received in action 201 above.

Action 303. The radio network node 12 may receive a number of uplink reference signals, each using a different precoder. In some embodiments uplink reference signals are using different precoders over different parts of a frequency spectrum.

Action 304. The radio network node 12 may then determine/select a preferred precoder out of the different precoders based on the received number of uplink reference signals. Furthermore, the radio network node 12 may take the obtained capability, action 300, into account when determining/selecting the preferred precoder.

Action 305. The radio network node 12 may transmit an indication of the preferred precoder to the wireless device 10.

Action 306. Alternatively, the radio network node 12 may receive an uplink reference signal, which uplink reference signal does not use a precoder. This may be the same signal as received in action 301 or a different uplink reference signal.

Action 307. The radio network node 12 may then determine/select a preferred precoder based on the received uplink reference signal. Furthermore, the radio network node 12 may take the obtained capability, action 300, into account when determining/selecting the preferred precoder.

Action 308. The radio network node 12 may further transmit an indication of the preferred precoder to the wireless device 10.

Action 309. The radio network node 12 receives a beamformed uplink reference signal from the wireless device 10.

Action 310. The radio network node 12 performs a channel estimation of the channel from the wireless device 10 based on the received beamformed uplink reference signal.

Figure 4:
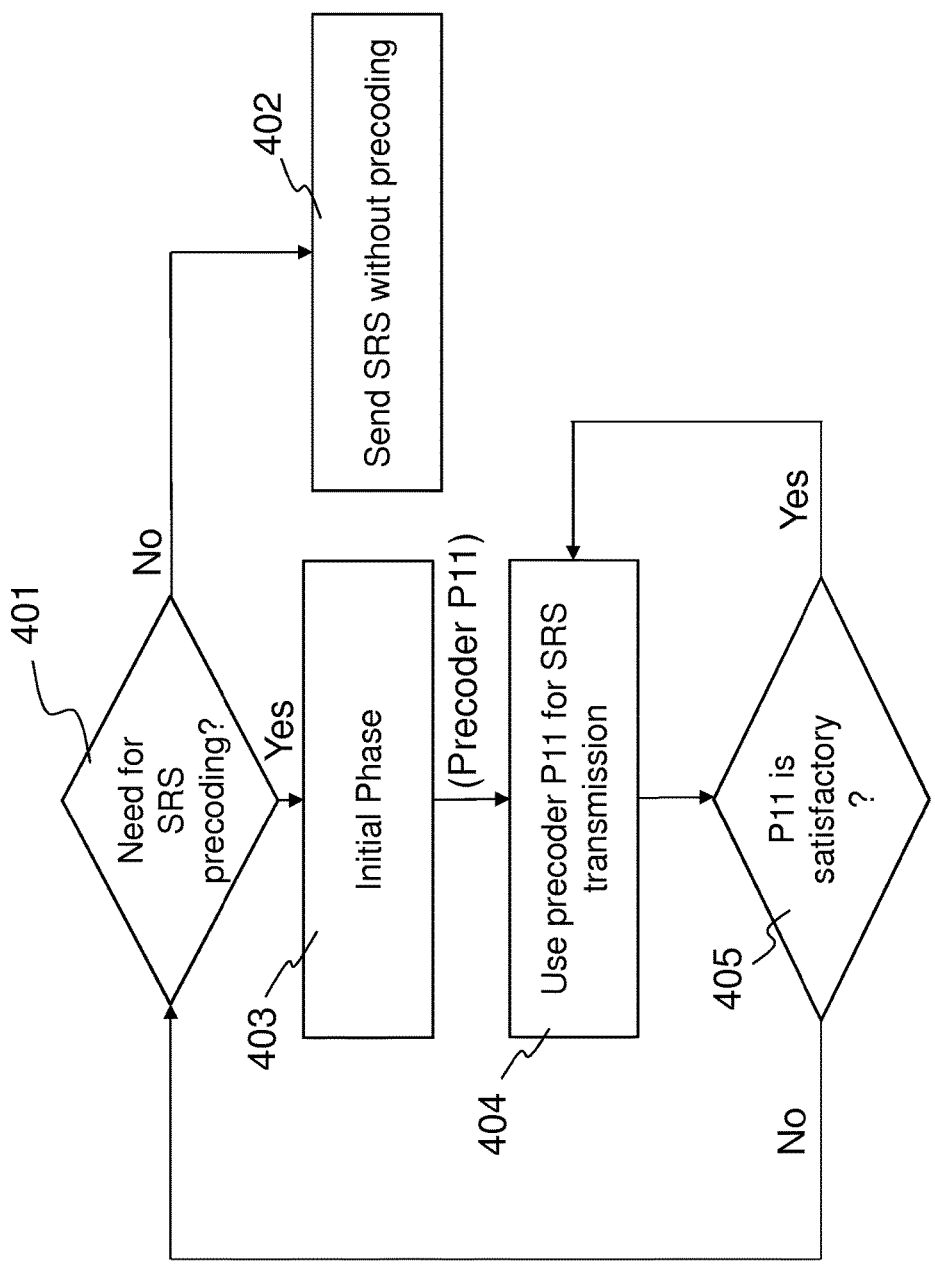
FIG. 4 is a schematic flowchart depicting a method according to embodiments herein.

As explained earlier, some embodiments promote to use an initial step during which the radio network node 12 and the wireless device 10 collaboratively tries to find a good precoder to be used by the wireless device 10 for the subsequent UL reference signal transmissions. Once such a precoder is found, it is used until the use of the precoder is not satisfactory any longer after which the radio network node 12 and the wireless device 10 will again try to find another candidate precoder. This is schematically depicted in FIG. 4.

Action 401. The radio network node 12 or the wireless device 10 determines whether there is a need for a beamforming of uplink reference signals, e.g. using SRS precoding. Thus, the radio network node 12 or the wireless device determines when to trigger the beamforming as shown above in FIGS. 2 and 3.

Action 402. The radio network node 12 or the wireless device 10 determines that beamforming e.g. SRS precoding is not needed and therefore the wireless device sends SRS without precoding.

Action 403. The radio network node 12 or the wireless device 10 determines that beamforming e.g. SRS precoding is needed and starts an initial phase to find an appropriate precoder e.g. initiating by trying a first precoder P11. Thus, the radio network node 12 or the wireless device finds and agrees on a precoder to use. The process may try a number of different precoders as explained below.

Action 404. The radio network node 12 and/or the wireless device 10 then agree to use e.g. the first precoder P11 out of a number of precoders, and the wireless device 10 uses the first precoder P11 for e.g. SRS transmissions as agreed. Then, the radio network node 12, knowing the agreed precoder e.g. the first precoder P11, may estimate the channel with a satisfactory result, e.g. performs a t CSI estimation.

Action 405. The process may be dynamical and the radio network node 12 and/or the wireless device 10 may periodically or continuously check that the precoder used, e.g. the first precoder P11, is satisfactory e.g. received signal strength or quality is over the first or second threshold. That being the case, the wireless device 10 continue using the first precoder P11. That not being the case, the process restarts and the radio network node 12 or the wireless device 10 determines whether there is a need for beamforming uplink reference signal e.g. SRS precoding.

Figure 5:
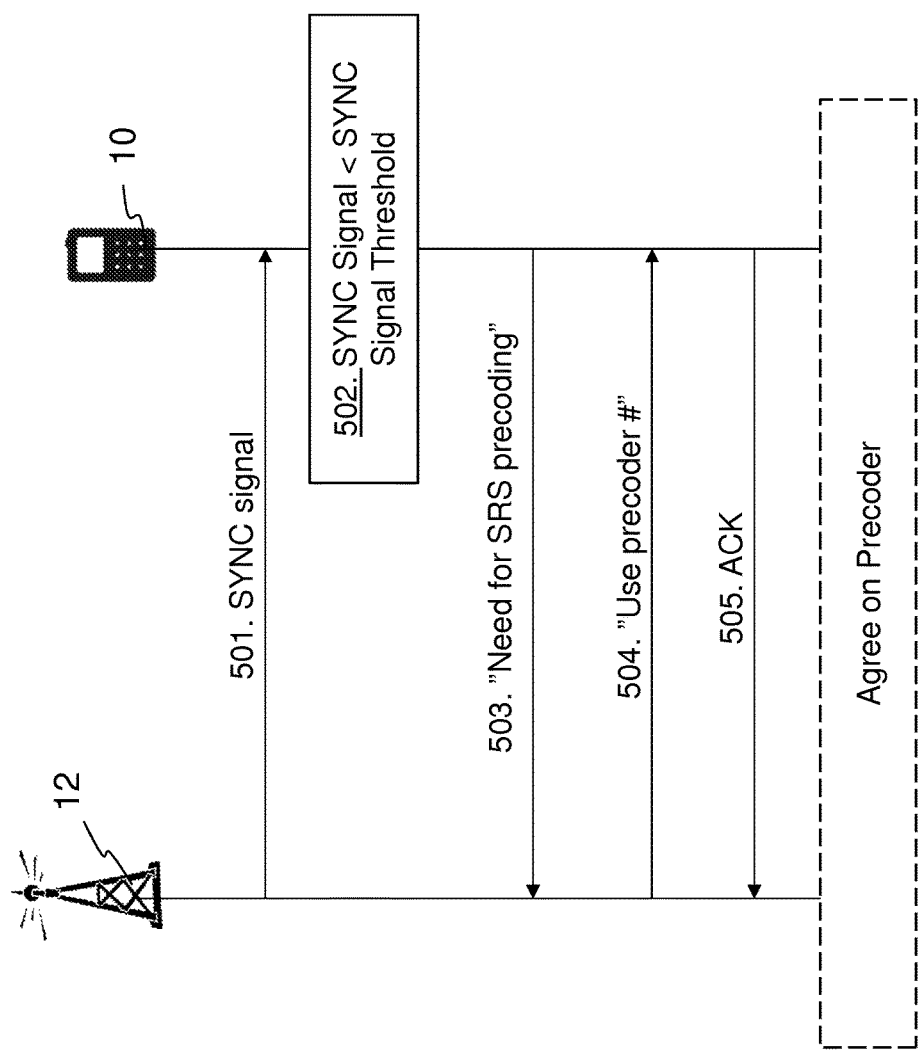
FIG. 5 is a combined signalling scheme and flowchart according to embodiments herein.

According to some embodiments herein wireless device measurements are based on e.g. downlink synchronization signals, such as a primary or a secondary synchronization signal in e.g. LTE systems, see FIG. 5. FIG. 5 shows embodiments where the triggering of beamforming uplink reference signals, e.g. SRS, is based on measurements at the wireless device 10 and autonomous beamforming.

Action 501. The radio network node 12 may transmit a synchronisation (SYNC) signal e.g. a primary or a secondary synchronization signal, to the wireless device 10.

Action 502. The wireless device 10 receives and measures signal strength or quality of the received SYNC signal, and then compares the measured signal strength or quality the first threshold e.g. a sync signal threshold.

Action 503. In case the measured signal strength or quality is below the first threshold, the wireless device 10 transmits an indication to the radio network node 12 that the wireless device 10 has a need for precoding SRS. Alternatively or additionally, the wireless device 10 may also signal its capabilities along with other relevant information when transmitting the "NEED FOR SRS PRECODING" message which facilitates the signaling handshake.

Action 504. The radio network node 12 transmits a precoder indication indicating a precoder to use, e.g. use precoder #, to the wireless device 10.

Action 505. The wireless device 10 acknowledges the precoder to use by sending an Acknowledgement (ACK) back to the radio network node 12.

Thus, when the measurement results performed by the wireless device 10 fall below a predefined threshold value, the wireless device 10 starts e.g. the SRS beamforming procedure. In one embodiment, the wireless device 10 only starts transmitting uplink reference signals when the radio network node 12 explicitly indicates the need for acquiring downlink CSI. Alternatively, the wireless device 10 may start transmitting uplink reference signals autonomously to enable the radio network node 12 to acquire uplink CSI for uplink data demodulation purposes.

Following this procedure the radio network node 12 and wireless device 10 may select a precoder by agreeing on precoder to use, as explained below in FIGS. 7-10.

Figure 6:
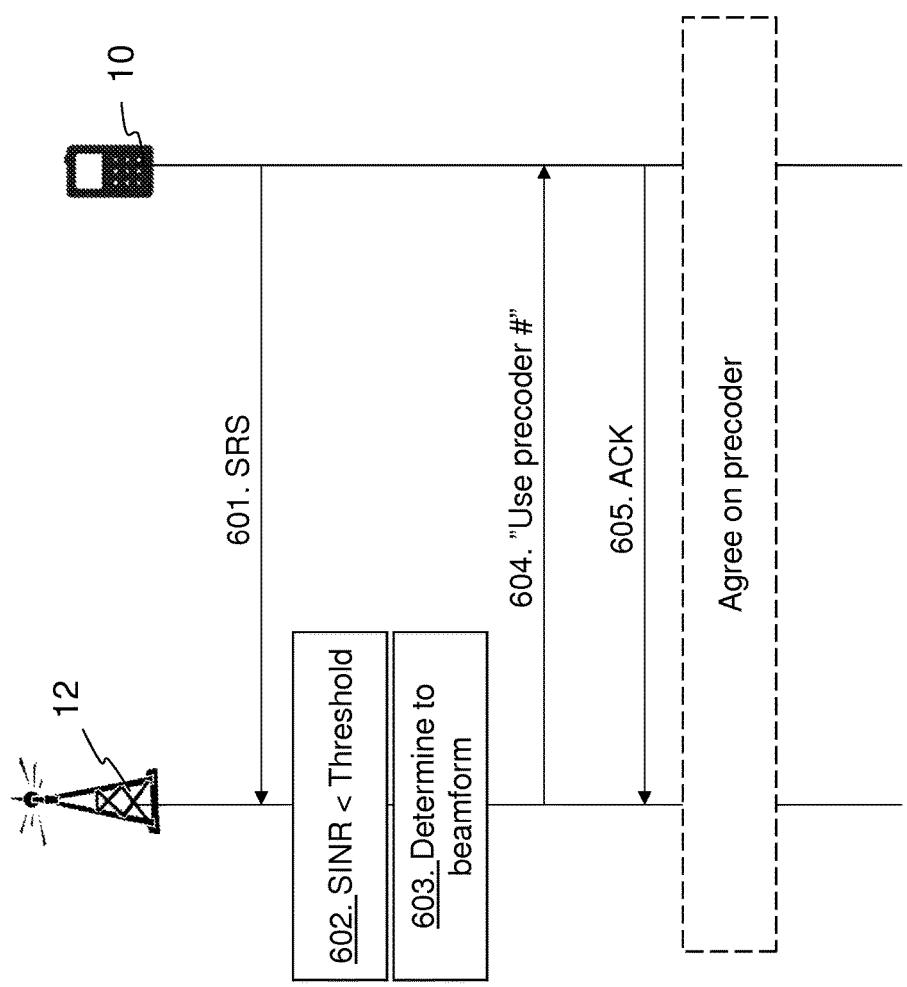
FIG. 6 is a combined signalling scheme and flowchart according to embodiments herein.

Alternatively or additionally, according to embodiments herein the determination may be based on radio network node measurements or radio network node time out, see FIG. 6. The triggering to use precoding or beamforming as referred to herein for the uplink reference signals, e.g. SRS, transmission may be initiated by either the radio network node 12 or by the wireless device 10 or both. If the SINR is below a threshold, the radio network node 12 may transmit a "USE SRS PRECODER" command to the wireless device 10 to instruct the wireless device 10 to enter the second phase which is to find a good precoding to use for SRS precoding. In some embodiments, the wireless device 10 will transmit an acknowledgement to indicate the safe reception of the triggering command. In some embodiments, the wireless device 10 will append a message to the acknowledgement signal for example to inform the radio network node 12 about its precoding capabilities, or a preferred method for finding the precoder. The signaling diagram according to this embodiment is illustrated in FIG. 6.

FIG. 6 shows embodiments where the triggering of beamforming uplink reference signals is based on measurements at the radio network node 12 also referred to as radio network node—triggered beamforming. The uplink reference signal is exemplified as an SRS.

Action 601. The wireless device 10 may transmit an SRS to the radio network node 12.

Action 602. The radio network node 12 measures signal strength or quality of the received SRS, e.g. Signal Interference plus Noise Ratio (SINR), and compares to a threshold. The radio network node 12 thus monitors the received SINR of e.g. the SRS transmission. The condition being here that when the SINR is below the second threshold the condition is fulfilled.

Action 603. When the condition is fulfilled, that is, the signal strength or quality is below the second threshold, the radio network node 12 determines to use beamforming for uplink reference signal for channel estimation. The radio network node 12 may select a precoder based on the measurement.

Action 604. The radio network node 12 may then transmit an indication to use the selected precoder # to the wireless device 10. Thus, if the SINR is below the second threshold, the radio network node 12 may transmit a "USE PRECODER #" command to the wireless device 10 to instruct the wireless device 10 to enter a second phase which is to find a good precoding to use for beamforming such as SRS precoding Action 605. The wireless device 10 acknowledges to use the precoder indicated by the radio network node 12 by transmitting an acknowledgement to the radio network node 12. Thus, the wireless device 10 agrees with the radio network node 12 to use a certain precoder.

Following this procedure the radio network node 12 and wireless device 10 may select a precoder by agreeing on precoder to use, as explained below with reference to FIGS. 7-10.

The wireless device measurement based solutions and the radio network node measurement based solutions, see FIGS. 5 and 6, may be advantageously combined in a scheme, in which either the radio network node 12 or the wireless device 10 may detect the need for the beamforming of the uplink reference signal.

Figure 7:
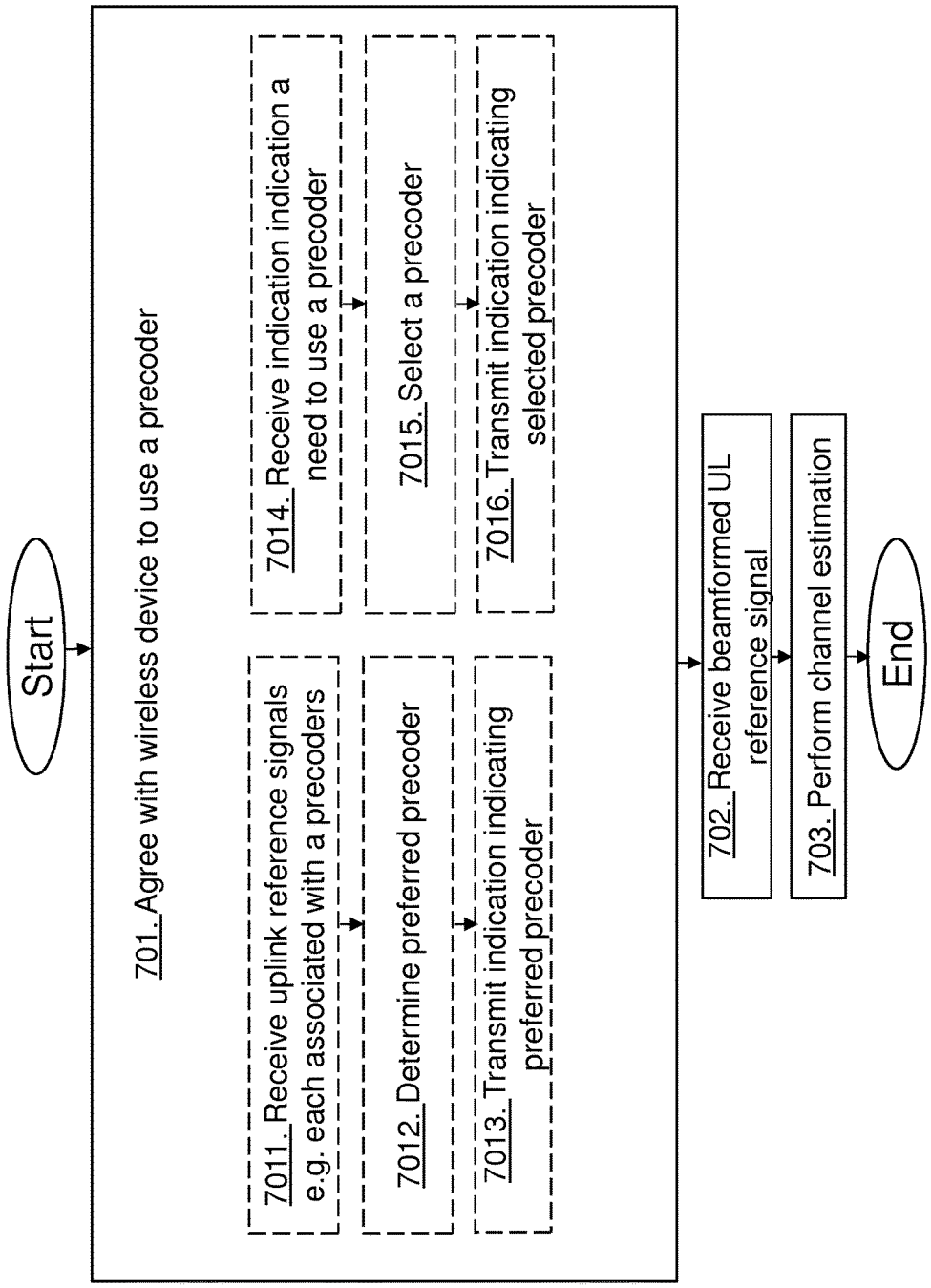
FIG. 7 is a schematic flowchart depicting a method performed by a radio network node according to embodiments herein.

An agreement to use a certain precoder may be performed in a numerous ways. FIG. 7 shows embodiments illustrating a method performed by the radio network node 12 for performing a channel estimation of a channel from the wireless device 10 in the wireless communication network 1.

Action 701. The radio network node 12 agrees with the wireless device 10 to use a precoder to beamform the uplink reference signal for channel estimation. As examples:

Action 7011. The radio network node 12 may receive one or more uplink reference signals. Each received uplink reference signals may be associated with a different precoder or with a different precoder over a different part of a frequency spectrum.

Action 7012. The radio network node 12 may determine a preferred precoder based on the received one or more uplink reference signals Action 7013. The radio network node 12 may then transmit an indication of the preferred precoder to the wireless device.

Action 7014. Alternatively, the radio network node 12 may receive an indication from the wireless device 10 indicating a need to use a precoder for beamforming the uplink reference signal.

Action 7015. The radio network node 12 may select a precoder for the wireless device 10 to use.

Action 7016. The radio network node 12 may then transmit to the wireless device an indication of the selected precoder.

Action 702. The radio network node 12 receives a beamformed uplink reference signal from the wireless device 10. This may in some embodiments be considered as a confirmation of the agreed precoder to use, alternatively an acknowledgement may be received. The radio network node 12 may receive an acknowledgement from the wireless device 10 acknowledging to use the preferred precoder. Hence, the radio network node 12 has agreed with the wireless device 10 to use the precoder, which is the preferred precoder.

Action 703. The radio network node 12 performs a channel estimation of a channel from the wireless device 10 based on the received beamformed uplink reference signal with knowledge of the precoder used. This is performed in an accurate manner since the precoder used for beamforming is known at the radio network node.

Figure 8:
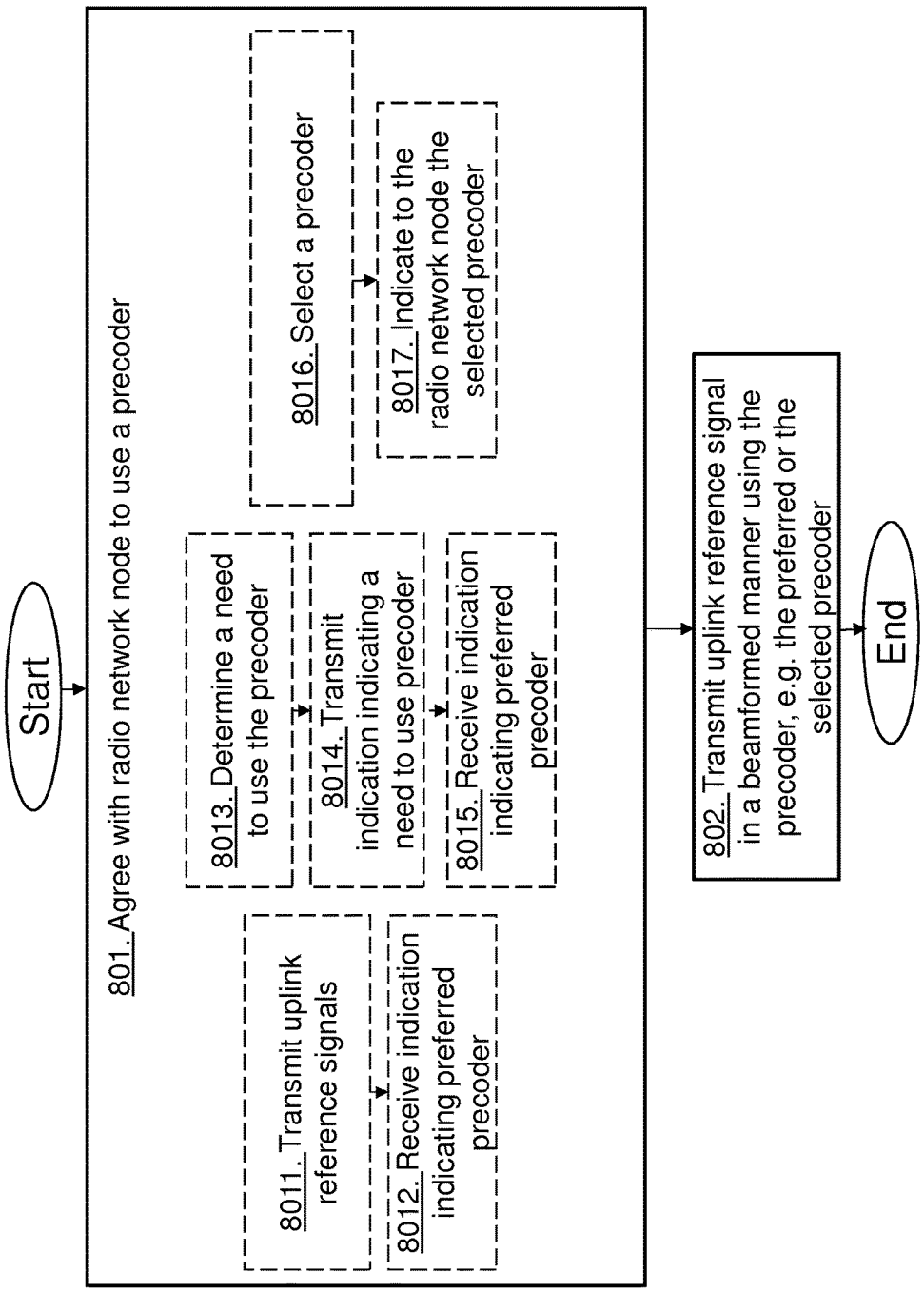
FIG. 8 is a schematic flowchart depicting a method performed by a wireless device according to embodiments herein.

FIG. 8 shows embodiments illustrating a method performed by the wireless device 10 for transmitting an uplink reference signal from the wireless device 10 to the radio network node 12 in the wireless communication network 1.

Action 801. The wireless device 10 agrees with the radio network node 12 to use a precoder to beamform the uplink reference signal for channel estimation. As examples:

Action 8011. The wireless device 10 may transmit one or more uplink reference signals. Each uplink reference signal may be transmitted with a different precoder or with a different precoder over a different part of a frequency spectrum.

Action 8012. The wireless device may then receive an indication of a preferred precoder from the radio network node.

Action 8013. The wireless device 10 may determine a need to use the precoder to beamform the uplink reference signal.

Action 8014. The wireless device 10 may transmit an indication to the radio network node 12 indicating a need to use the precoder for beamforming the uplink reference signal.

Action 8015. The wireless device 10 may receive from the radio network node 12 an indication of a preferred precoder.

Action 8016. The wireless device 10 may select a precoder to beamform the uplink reference signal. The wireless device 10 may take additional information into account when selecting the precoder e.g. precoder previously used, Angle of Arrival, precoder used as DMRS given that the wireless device 10 has active uplink session, or similar.

Action 8017. The wireless device 10 may indicate to the radio network node 12 the selected precoder.

Action 802. Upon agreeing, the wireless device 10 transmits a beamformed uplink reference signal from the wireless device 10 using the precoder, e.g. the preferred or selected precoder. In some embodiments the wireless device 10 transmits the beamformed uplink reference signal using the preferred or selected precoder thereby confirming use of the preferred or selected precoder, alternatively, the wireless device may transmit an acknowledgement to the radio network node 12 acknowledging to use the preferred precoder.

In one embodiment, the wireless device 10 and the radio network node 12 may agree on a set of possible precoders in advance. An advantage of embodiments of the claimed solution is that applying an appropriately chosen precoder, by agreeing the precoder to use with one another, would boost the received uplink reference signal energy at the radio network node and enable an efficient decoding of the received uplink reference signal. Thus, this results in a more reliable channel estimation for wireless devices and this results in an improved performance of the wireless communication network.

Figure 9:
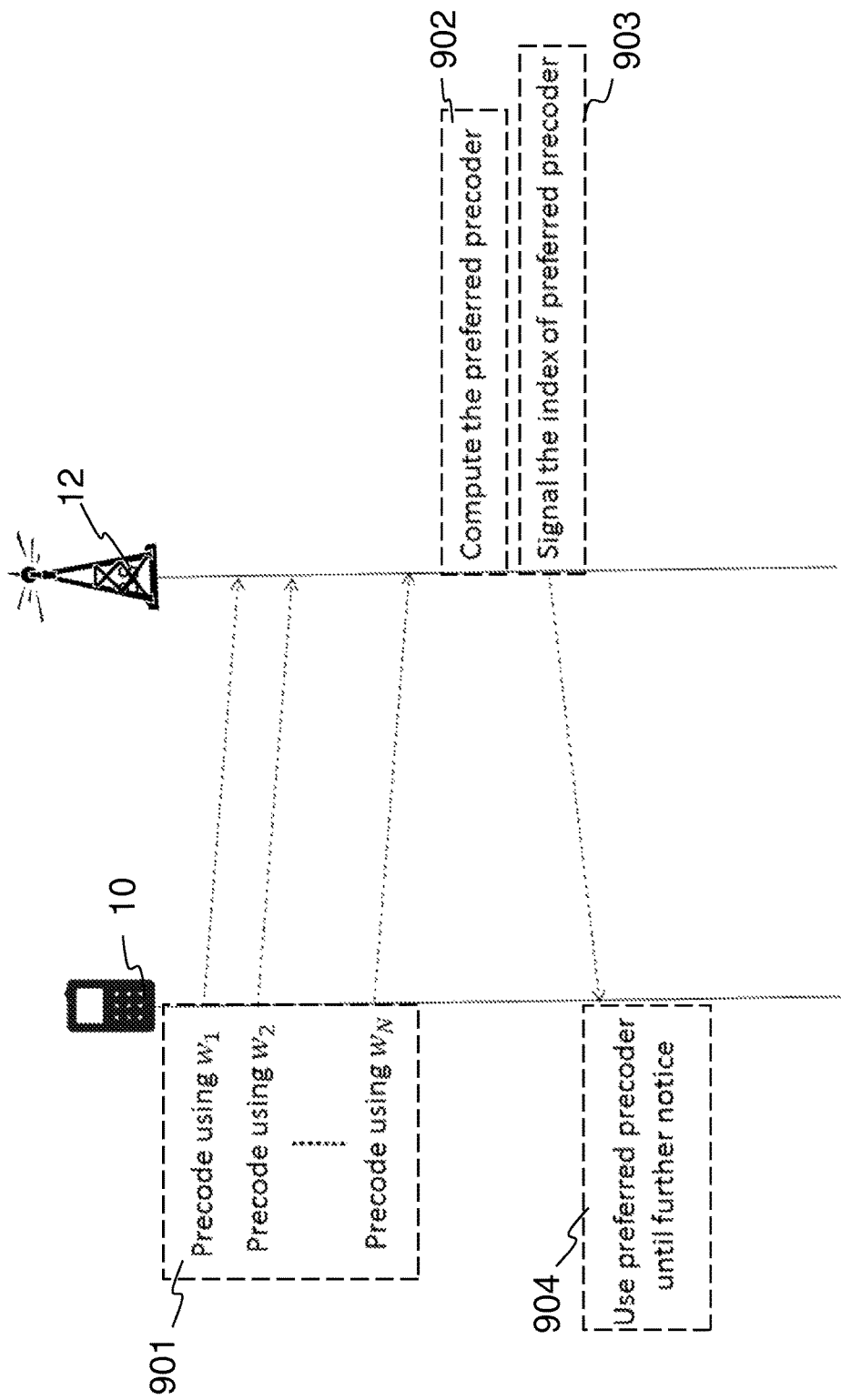
FIG. 9 is a combined signalling scheme and flowchart according to embodiments herein.

This is illustrated schematically in FIG. 9. Let e.g. $w_1, w_2, \ldots, w_N$ be the possible precoders that could be potentially used. During the initial step, action 901, the wireless device 10 may try all of a plurality of different precoders consecutively, i.e. uses precoder $w_i$ in the ith e.g. SRS transmission with i=1, ..., N. Action 902, the radio network node 12 may compute the preferred precoder based on the received signals. Action 903, then the radio network node 12 may signal the best precoder which will be the preferred precoder, e.g. may signal the index of the preferred precoder. Action 904, the wireless device 10 may then use the preferred precoder until further notice. Clearly, this scheme requires N number of uplink reference signal transmissions in order to find an appropriate precoder. This might not be practical in scenarios where N is large or when the physical channel changes rapidly. Therefore, in another embodiment the wireless device 10 may try different precoders in a subsequent fashion and once the radio network node 12 finds a good enough precoder, it informs the wireless device 10 and the search will stop, i.e. the wireless device 10 will node try more precoders. Good enough herein may mean whether signal strength or quality is above an additional threshold.

Figure 10:
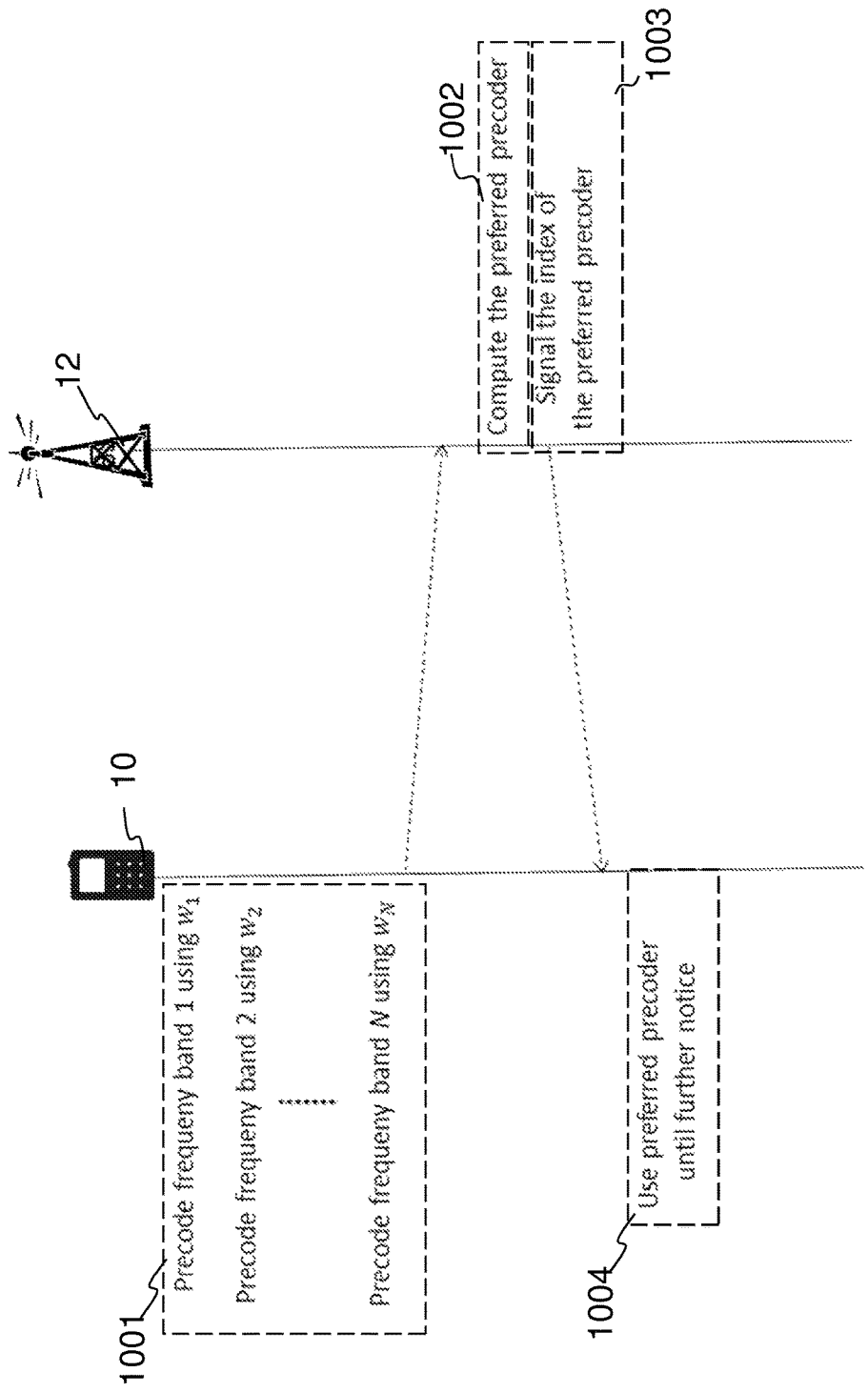
FIG. 10 is a combined signalling scheme and flowchart according to embodiments herein.

Alternatively or additionally, the wireless device 10 may apply different precoders for different parts of the frequency band, e.g. in a manner that is known to the radio network node 12. Then the radio network node 12 may signal the preferred precoder by comparing the received SNR of the corresponding frequency bands. This embodiment is also illustrated in FIG. 10.

Action 1001. The wireless device 10 may try all different precoders consecutively over different bandwidths, i.e. uses precoder $w_i$ in the ith e.g. SRS transmission with i=1, ..., N over respective bandwidths 1-N.

Action 1002, the radio network node 12 may compute the preferred precoder over a certain bandwidth based on the received signals.

Action 1003, then the radio network node 12 may signal the best precoder which will be the preferred precoder, e.g. may signal the index of the preferred precoder.

Action 1004, the wireless device 10 may then use the preferred precoder until further notice.

In some embodiments, the wireless device 10 may use the precoder that it uses for the DMRS, assuming that the wireless device 10 may have active uplink communication with the radio network node 12. In another embodiment, the wireless device 10 first transmits the uplink reference signal, e.g. SRS, without applying any precoder. Then the radio network node 12 may calculate the preferred precoder and signals that to the wireless device 10.

Figure 11:
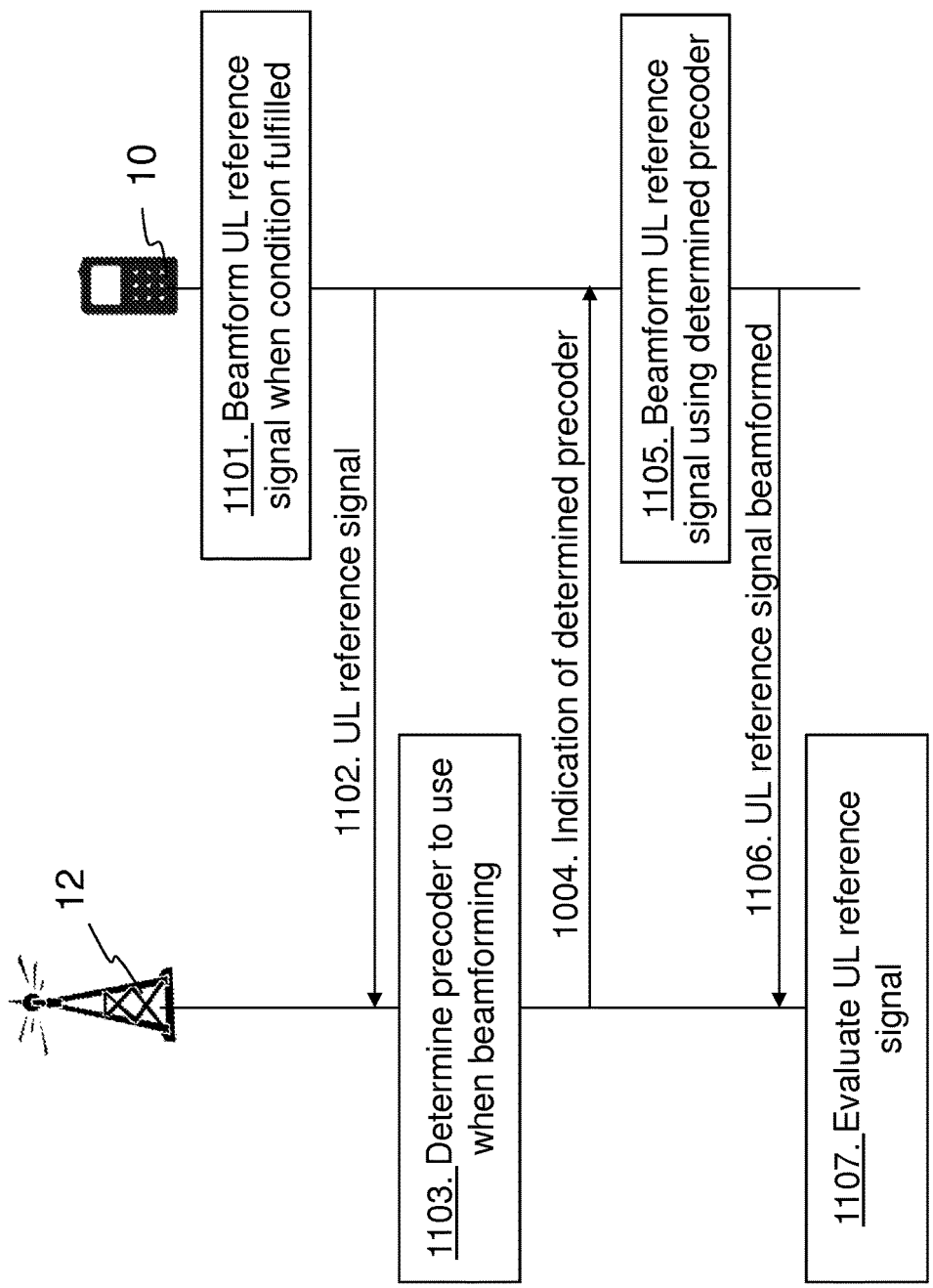
FIG. 11 is a combined signalling scheme and flowchart depicting embodiments herein.

FIG. 11 shows a combined signaling scheme and flowchart depicting some embodiments herein.

Action 1101. The wireless device 10 may determine to beamform the uplink reference signal when a condition is fulfilled, e.g. received sync signals are below the sync threshold.

Action 1102. The wireless device may then transmit one or more uplink reference signals to the radio network node 12, e.g. wherein each uplink reference signal is transmitted using a different precoder.

Action 1103. The radio network node 12 may determine a precoder, also referred to as preferred precoder, to use when beamforming uplink reference signals at the wireless device 10 based on the received uplink references signals.

Action 1104. The radio network node 12 may transmit an indication of the determined precoder to the wireless device 10.

Action 1105. The wireless device 10 may beamform the UL reference signal towards the radio network node 12 using determined precoder.

Action 1106. The wireless device 10 may transmit the beamformed uplink reference signal to the radio network node 12.

Action 1107. The radio network node 12 may then evaluate the beamformed uplink reference signal continuously, periodically or when a change has occurred such as channel state has changed or similar.

In order to perform the methods herein a radio network node and a wireless device are herein provided.

Figure 12:
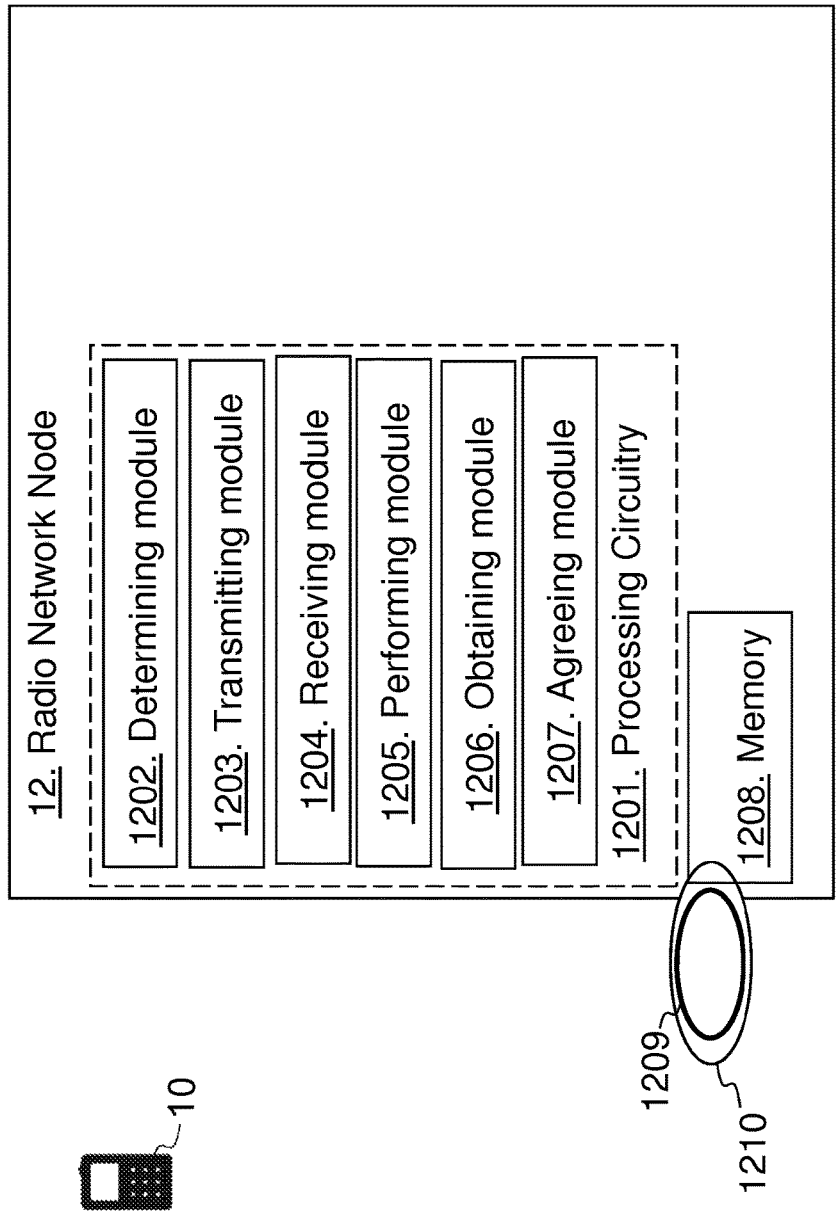
FIG. 12 is a block diagram depicting a radio network node according to embodiments herein.

FIG. 12 shows a block diagram depicting the radio network node 12 for performing a channel estimation of a channel from the wireless device 10 in the wireless communication network 1.

Embodiments herein provide the radio network node 12 that is configured to determine to beamform a transmission of an uplink reference signal for channel estimation from the wireless device 10 when a condition is fulfilled. The radio network node 12 is further configured to transmit an order to beamform the transmission of the uplink reference signal to the wireless device 10. The radio network node 12 is further configured to receive a beamformed uplink reference signal from the wireless device 10. The radio network node 12 is configured to perform a channel estimation of a channel from the wireless device 10 based on the received beamformed uplink reference signal.

The radio network node 12 may be configured to determine to beamform the transmission by comparing a received signal strength of a received signal from the wireless device 10 with a second threshold for received signals. The condition then defines that when the received signal strength is below the second threshold for received signals the condition is fulfilled and the radio network node 12 is configured to determine to beamform the transmission. The received signal may be a sounding reference signal, an uplink reference signal, a demodulation reference signal, synchronisation signal, a common reference signal and/or downlink payload.

The radio network node 12 may be configured to determine to beamform the transmission by comparing a received signal strength of a sounding reference signal from the wireless device 10 with a received signal strength of a demodulation reference signal. The condition then defines that when a difference of the received signal strength of the sounding reference signal and the received signal strength of a demodulation reference signal is above a third threshold the condition is fulfilled and the radio network node 12 is configured to determine to beamform the transmission.

The radio network node 12 may be configured to take location of the wireless device 10 into account when determining to beamform the transmission.

The radio network node 12 may be configured to receive a number of uplink reference signals, each using a different precoder. The radio network node 12 may then be configured to determine a preferred precoder out of the different precoders based on the received number of uplink reference signals; and to transmit an indication of the preferred precoder to the wireless device 10.

The radio network node 12 may be configured to receive an uplink reference signal, which uplink reference signal does not use a precoder. The radio network node 12 may then be configured to determine a preferred precoder based on the received uplink reference signal; and to transmit an indication of the preferred precoder to the wireless device 10.

The radio network node 12 may be configured to obtain capability of the wireless device 10 associated with use of precoders; and to take the obtained capability into account when determining a preferred precoder.

The radio network node 12 may be configured to obtain capability of the wireless device 10 associated with use of precoders; and to take the obtained capability into account when determining to beamform.

The radio network node 12 may comprise processing circuitry 1201 configured to perform the methods herein. Furthermore, the radio network node may comprise a determining module 1202.

The processing circuitry 1201 and/or the determining module 1202 may be configured to determine to beamform a transmission of an uplink reference signal for channel estimation from the wireless device 10 when a condition is fulfilled. The processing circuitry 1201 and/or the determining module 1202 may be configured to determine to beamform the transmission by comparing a received signal strength of a received signal from the wireless device 10 with a second threshold for received signals. The condition then defines that when the received signal strength is below the second threshold for received signals the condition is fulfilled and the processing circuitry 1201 and/or the determining module 1202 is configured to determine to beamform the transmission. The received signal may be a sounding reference signal, an uplink reference signal, a demodulation reference signal, synchronisation signal, a common reference signal and/or downlink payload.

The processing circuitry 1201 and/or the determining module 1202 may be configured to determine to beamform the transmission by comparing a received signal strength of a sounding reference signal from the wireless device 10 with a received signal strength of a demodulation reference signal. The condition then defines that when a difference of the received signal strength of the sounding reference signal and the received signal strength of a demodulation reference signal is above a third threshold the condition is fulfilled and the processing circuitry 1201 and/or the determining module 1202 is configured to determine to beamform the transmission. The processing circuitry 1201 and/or the determining module 1202 may be configured to take location of the wireless device 10 into account when determining to beamform the transmission.

The radio network node 12 may comprise a transmitting module 1203. The processing circuitry 1201 and/or the transmitting module 1203 may be configured to transmit an order to beamform the transmission of the uplink reference signal to the wireless device 10.

The radio network node 12 may comprise a receiving module 1204. The processing circuitry 1201 and/or the receiving module 1204 may be configured to receive a beamformed uplink reference signal from the wireless device 10.

The radio network node 12 may comprise a performing module 1205. The processing circuitry 1201 and/or the performing module 1205 may be configured to perform a channel estimation of a channel from the wireless device 10 based on the received beamformed uplink reference signal.

The processing circuitry 1201 and/or the receiving module 1204 may be configured to receive a number of uplink reference signals, each using a different precoder. The processing circuitry 1201 and/or the determining module 1202 may then be configured to determine a preferred precoder out of the different precoders based on the received number of uplink reference signals. The processing circuitry 1201 and/or the transmitting module 1203 may then be configured to transmit an indication of the preferred precoder to the wireless device 10.

The processing circuitry 1201 and/or the receiving module 1204 may be configured to receive an uplink reference signal, which uplink reference signal does not use a precoder. The processing circuitry 1201 and/or the determining module 1202 may then be configured to determine a preferred precoder based on the received uplink reference signal. The processing circuitry 1201 and/or the transmitting module 1203 may then be configured to transmit an indication of the preferred precoder to the wireless device 10.

The radio network node 12 may comprise an obtaining module 1206. The processing circuitry 1201 and/or the obtaining module 1206 may be configured to obtain capability of the wireless device 10 associated with use of precoders. The processing circuitry 1201 and/or the determining module 1202 may then be configured to take the obtained capability into account when determining a preferred precoder, and/or the processing circuitry 1201 and/or the determining module 1202 may then be configured to take the obtained capability into account when determining to beamform.

Embodiments herein provide radio network node 12 that is configured to agree with the wireless device 10 to use a precoder to beamform the uplink reference signal for channel estimation. The radio network node 12 is further configured to receive a beamformed uplink reference signal from the wireless device 10 and to perform a channel estimation of a channel from the wireless device 10 based on the received beamformed uplink reference signal with knowledge of the precoder used.

The radio network node 12 may be configured to agree with the wireless device by: receiving one or more uplink reference signals; determining a preferred precoder based on the received one or more uplink reference signals; and transmitting an indication of the preferred precoder to the wireless device 10. Each received uplink reference signals may be associated with a different precoder or with a different precoder over a different part of a frequency spectrum.

The radio network node 12 may be configured to agree with the wireless device by: receiving an indication from the wireless device 10 indicating a need to use a precoder for beamforming the uplink reference signal; selecting a precoder for the wireless device 10 to use; and transmitting to the wireless device (10) an indication of the selected precoder.

The radio network node 12 may comprise an agreeing module 1207. The processing circuitry 1201 and/or the agreeing module 1207 may be configured to agree with the wireless device 10 to use a precoder to beamform the uplink reference signal for channel estimation. The processing circuitry 1201 and/or the receiving module 1204 may be configured to receive a beamformed uplink reference signal from the wireless device 10. The processing circuitry 1201 and/or the performing module 1205 may then be configured to perform a channel estimation of a channel from the wireless device 10 based on the received beamformed uplink reference signal with knowledge of the precoder used.

The processing circuitry 1201 and/or the agreeing module 1207 may be configured to agree with the wireless device by: receiving one or more uplink reference signals; determining a preferred precoder based on the received one or more uplink reference signals; and transmitting an indication of the preferred precoder to the wireless device 10. Each received uplink reference signals may be associated with a different precoder or with a different precoder over a different part of a frequency spectrum.

The processing circuitry 1201 and/or the agreeing module 1207 may be configured to agree with the wireless device by: receiving an indication from the wireless device 10 indicating a need to use a precoder for beamforming the uplink reference signal; selecting a precoder for the wireless device 10 to use; and transmitting to the wireless device 10 an indication of the selected precoder.

The radio network node 12 may comprise a memory 1208. The memory comprises one or more units to be used to store data on, such as thresholds, orders, precoders, signal strengths/qualities, applications to perform the methods disclosed herein when being executed, and similar.

The methods according to the embodiments described herein for the radio network node 12 may be implemented by means of e.g. a computer program 1209 or a computer program product, comprising instructions, i.e., software code portions, which, when executed on at least one processor, cause the at least one processor to carry out the actions described herein, as performed by the radio network node 12. The computer program 1209 may be stored on a computer-readable storage medium 1210, e.g. a disc or similar. The computer-readable storage medium 1210, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

Figure 13:
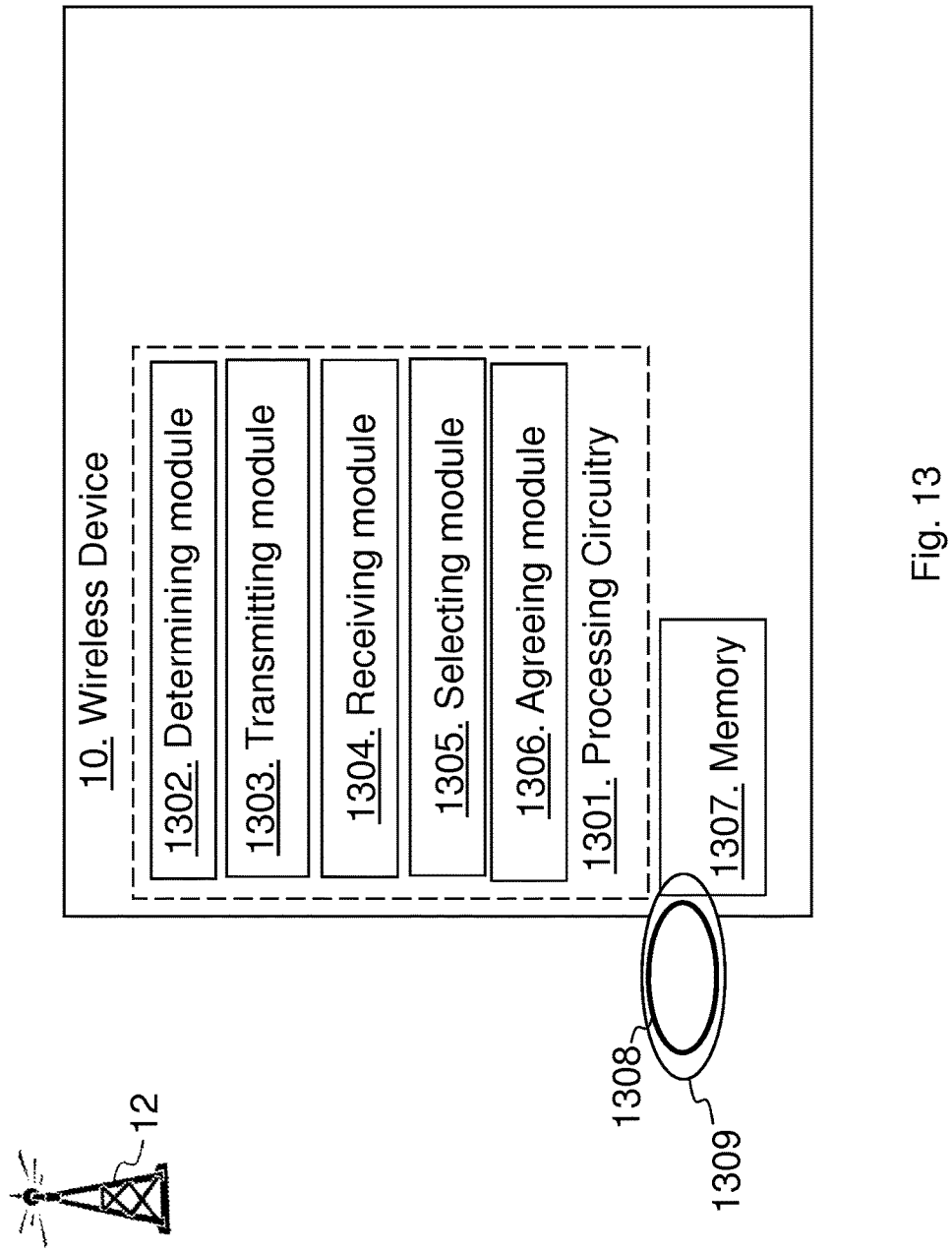
FIG. 13 is a block diagram depicting a wireless device according to embodiments herein.

FIG. 13 shows a block diagram depicting the wireless device 10 for transmitting an uplink reference signal to the radio network node 12 in the wireless communication network according to embodiments herein. The wireless device 10 may comprise processing circuitry 1301 configured to perform the methods herein.

Embodiments herein provide the wireless device 10 that is configured to determine to beamform a transmission of an uplink reference signal for channel estimation when a condition is fulfilled. The wireless device 10 may comprise a determining module 1302. The processing circuitry 1301 and/or the determining module 1302 may be configured to determine to beamform a transmission of an uplink reference signal for channel estimation when a condition is fulfilled.

The wireless device 12 may be configured to determine to beamform by comparing a received signal strength/quality of a received signal from the radio network node 12 with a first threshold for received signals and the condition defines that when the received signal strength/quality is below the first threshold for received signals the condition is fulfilled and the wireless device 10 is configured to determine to beamform the transmission. The received signal may be a synchronisation signal, a common reference signal and/or downlink payload. The processing circuitry 1301 and/or the determining module 1302 may be configured to determine to beamform by comparing a received signal strength/quality of a received signal from the radio network node 12 with a first threshold for received signals and the condition defines that when the received signal strength/quality is below the first threshold for received signals the condition is fulfilled and the wireless device 10 is configured to determine to beamform the transmission.

The wireless device 10 may be configured to determine to beamform by receiving an order from the radio network node 12 to beamform the uplink reference signal and the condition defines that when receiving said order the condition is fulfilled and the wireless device 10 is configured to determine to beamform the transmission. The processing circuitry 1301 and/or the determining module 1302 may be configured to determine to beamform by receiving the order from the radio network node 12 to beamform the uplink reference signal and the condition defines that when receiving said order the condition is fulfilled and the wireless device 10 is configured to determine to beamform the transmission.

The wireless device 10 is further configured to transmit the uplink reference signal to the radio network node in a beamformed manner when the condition is fulfilled. The wireless device 10 may comprise a transmitting module 1303. The processing circuitry and/or the transmitting module 1303 may be configured to transmit the uplink reference signal to the radio network node in the beamformed manner when the condition is fulfilled.

The wireless device 12 may be configured to transmit an indication to the radio network node indicating that the wireless device 10 will beamform the uplink reference signal. The processing circuitry and/or the transmitting module 1303 may be configured to transmit the indication to the radio network node indicating that the wireless device 10 will beamform the uplink reference signal.

The wireless device 10 may further be configured to transmit the uplink reference signal a number of times using different precoders. The processing circuitry 1301 and/or the transmitting module 1303 may be configured to transmit the uplink reference signal a number of times using different precoders.

The wireless device 10 may be configured to receive a response from the radio network node 12 indicating a preferred precoder out of the different precoders.

The wireless device 10 may comprise a receiving module 1304. The processing circuitry 1301 and/or the receiving module 1304 may be configured to receive the response from the radio network node 12 indicating a preferred precoder out of the different precoders.

The wireless device 10 may further be configured to transmit the uplink reference signal to the radio network node 12 in a beamformed manner by using the indicated preferred precoder to beamform the transmission. The processing circuitry 1301 and/or the transmitting module 1303 may be configured to transmit the uplink reference signal to the radio network node 12 in a beamformed manner by using the indicated preferred precoder to beamform the transmission.

The wireless device 10 may further be configured to transmit the uplink reference signal without using a precoder. The processing circuitry 1301 and/or the transmitting module 1303 may be configured to transmit the uplink reference signal without using a precoder.

The wireless device 10 may be configured to receive a response from the radio network node indicating a preferred precoder. The processing circuitry 1301 and/or the receiving module 1304 may be configured to receive the response from the radio network node 12 indicating the preferred precoder.

The wireless device 10 may further be configured to transmit the uplink reference signal to the radio network node 12 in a beamformed manner by using the indicated preferred precoder to beamform the transmission. The processing circuitry 1301 and/or the transmitting module 1303 may be configured to transmit the uplink reference signal to the radio network node 12 in a beamformed manner by using the indicated preferred precoder to beamform the transmission.

The wireless device 10 may further be configured to transmit the uplink reference signal a number of times using different precoders over different parts of a frequency spectrum. The processing circuitry 1301 and/or the transmitting module 1303 may be configured to transmit the uplink reference signal a number of times using different precoders over different parts of a frequency spectrum.

The wireless device 10 may be configured to receive a response from the radio network node 12 indicating a preferred precoder out of the different precoders. The processing circuitry 1301 and/or the receiving module 1304 may be configured to receive.

The wireless device 10 may further be configured to transmit the uplink reference signal to the radio network node 12 in a beamformed manner by using the indicated preferred precoder to beamform the transmission. The processing circuitry 1301 and/or the transmitting module 1303 may be configured to transmit the uplink reference signal to the radio network node 12 in a beamformed manner by using the indicated preferred precoder to beamform the transmission.

The wireless device 10 may further be configured to select a precoder to beamform the uplink reference signal, and being configured to transmit the uplink reference signal to the radio network node 12 in a beamformed manner by using the selected precoder. The wireless device 10 may comprise a selecting module 1305. The processing circuitry 1301 and/or the selecting module 1305 may be configured to select a precoder to beamform the uplink reference signal, and being configured to transmit the uplink reference signal to the radio network node 12 in a beamformed manner by using the selected precoder.

The wireless device 10 may further be configured to take an additional information into account when selecting the precoder. The processing circuitry 1301 and/or the selecting module 1305 may be configured to take the additional information into account when selecting the precoder.

Embodiments herein provide the wireless device 10 that is configured to agree with the radio network node 12 to use a precoder to beamform the uplink reference signal for channel estimation. Upon agreeing, the wireless device 10 is configured to transmit a beamformed uplink reference signal to the radio network node 12 using the precoder.

The wireless device 10 may be configured to agree with the radio network node 12 by transmitting one or more uplink reference signals; receiving an indication of a preferred precoder from the radio network node 12. The wireless device 10 may then be configured to transmit the beamformed uplink reference signal by using the preferred precoder.

The wireless device 10 may be configured to transmit each uplink reference signal with a different precoder or with a different precoder over a different part of a frequency spectrum.

The wireless device 10 may be configured to agree with the radio network node 12 by: determining a need to use the precoder to beamform the uplink reference signal; transmitting an indication to the radio network node 12 indicating a need to use the precoder for beamforming the uplink reference signal; and receiving from the radio network node 12 an indication of a preferred precoder. The wireless device 10 may then be configured to transmit the beamformed uplink reference signal by using the preferred precoder.

The wireless device 10 may be configured to agree with the radio network node 12 by: selecting a precoder to beamform the uplink reference signal; and indicating to the radio network node 12 the selected precoder. The wireless device 10 may then be configured to transmit the beamformed uplink reference signal to the radio network node 12 by using the selected precoder.

The wireless device 10 may be configured to take an additional information into account when selecting the precoder.

The wireless device 10 may comprise an agreeing module 1306. The processing circuitry 1301 and/or the agreeing module 1306 may be configured to agree with the radio network node 12 to use a precoder to beamform the uplink reference signal for channel estimation. The processing circuitry 1301 and/or the transmitting module 1303 may be configured to, upon agreeing, transmit a beamformed uplink reference signal to the radio network node 12 using the precoder.

The processing circuitry 1301 and/or the agreeing module 1306 may be configured to agree with the radio network node 12 by transmitting one or more uplink reference signals; receiving an indication of a preferred precoder from the radio network node 12. The processing circuitry 1301 and/or the transmitting module 1303 may then be configured to transmit the beamformed uplink reference signal by using the preferred precoder.

The processing circuitry 1301 and/or the transmitting module 1303 may be configured to transmit each uplink reference signal with a different precoder or with a different precoder over a different part of a frequency spectrum.

The processing circuitry 1301 and/or the agreeing module 1306 may be configured to agree with the radio network node 12 by: determining a need to use the precoder to beamform the uplink reference signal; transmitting an indication to the radio network node 12 indicating a need to use the precoder for beamforming the uplink reference signal; and receiving from the radio network node 12 an indication of a preferred precoder. The processing circuitry 1301 and/or the transmitting module 1303 may then be configured to transmit the beamformed uplink reference signal by using the preferred precoder.

The processing circuitry 1301 and/or the agreeing module 1306 may be configured to agree with the radio network node 12 by: selecting a precoder to beamform the uplink reference signal; and indicating to the radio network node 12 the selected precoder. The processing circuitry 1301 and/or the transmitting module 1303 may then be configured to transmit the beamformed uplink reference signal to the radio network node 12 by using the selected precoder.

The processing circuitry 1301 and/or the agreeing module 1306 may be configured to take an additional information into account when selecting the precoder.

The wireless device 10 further comprises a memory 1307. The memory comprises one or more units to be used to store data on, such as thresholds, orders, precoders, signal strengths/qualities, applications to perform the methods disclosed herein when being executed, and similar.

The methods according to the embodiments described herein for the wireless terminal 10 may be implemented by means of e.g. a computer program 1308 or a computer program product, comprising instructions, i.e., software code portions, which, when executed on at least one processor, cause the at least one processor to carry out the actions described herein, as performed by the wireless terminal 10. The computer program 1308 may be stored on a computer-readable storage medium 1309, e.g. a disc or similar. The computer-readable storage medium 1309, having stored thereon the computer program, may comprise the instructions which, when executed on at least one processor, cause the at least one processor to carry out the actions described herein, as performed by the wireless terminal 10. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a wireless device for transmitting an uplink reference signal to a radio network node in a wireless communication network, the method comprising:
   determining whether or not a condition for using beamforming for transmission of the uplink reference signal is fulfilled, wherein the determining comprises deeming the condition to be fulfilled responsive to determining that a received signal strength or quality of a received signal from the radio network node is below a defined threshold; and
   triggering the use of beamforming by the wireless device, for transmitting the uplink reference signal to the radio network node in a beamformed manner, in response to determining that the condition is fulfilled.

2. The method according to claim 1, wherein the received signal is at least one of: a synchronisation signal, a common reference signal, and a downlink payload.

3. The method according to claim 1, further comprising transmitting an indication to the radio network node indicating that the wireless device will beamform the uplink reference signal.

4. The method according to claim 1, further comprising:
transmitting the uplink reference signal a number of times using different precoders;
receiving a response from the radio network node indicating a preferred precoder out of the different precoders; and
wherein transmitting the uplink reference signal to the radio network node in a beamformed manner comprises transmitting the uplink reference signal to the radio network node using the preferred precoder.

5. The method according to claim 1, further comprising:
transmitting the uplink reference signal without using a precoder;
receiving a response from the radio network node indicating a preferred precoder; and
wherein transmitting the uplink reference signal to the radio network node in a beamformed manner comprises using the preferred precoder to beamform the transmission.

6. The method according to claim 1, further comprising transmitting the uplink reference signal a number of times using different precoders over different parts of a frequency spectrum;
receiving a response from the radio network node indicating a preferred precoder out of the different precoders; and
wherein transmitting the uplink reference signal to the radio network node in a beamformed manner comprises using the preferred precoder to beamform the transmission.

7. The method according to claim 1, further comprising:
selecting a precoder to beamform the uplink reference signal; and
wherein transmitting the uplink reference signal to the radio network node in a beamformed manner comprises using the selected precoder.

8. The method according to claim 7, wherein the selecting of the precoder includes selecting the precoder to use from among a number of possible precoders in consideration of at least one of: a previous precoder selection by the wireless device, an angle of arrival of a signal received from the radio network node, and, at least in cases where the wireless device has an active uplink session, which precoder is used for Demodulation Reference Signal (DMRS) transmission.

9. A wireless device configured for operation in a wireless communication network and comprising:
a radio receiver and transmitter for receiving signals from the wireless communication network and transmitting signals to the wireless communication network; and
processing circuitry operatively associated with the radio receiver and transmitter and configured to:
determine whether or not a condition to use beamforming for transmitting an uplink reference signal to a radio network node is fulfilled, wherein the radio network node uses the uplink reference signal for estimating a channel from the wireless device; and
trigger the use of beamforming by the wireless device, for transmitting the uplink reference signal to the radio network node in a beamformed manner, in response to determining that the condition is fulfilled;
wherein the processing circuitry is configured to deem the condition to be fulfilled in response to determining that a received signal strength or quality of a received signal from the radio network node is below a defined threshold.

10. The wireless device according to claim 9, wherein the received signal is at least one of: a synchronisation signal, a common reference signal, and a downlink payload.

11. The wireless device according to claim 9, wherein the processing circuitry is configured to transmit an indication to the radio network node, indicating that the wireless device will beamform the uplink reference signal.

12. The wireless device according to claim 9, wherein the processing circuitry is configured to:
transmit the uplink reference signal a number of times using different precoders;
receive a response from the radio network node indicating a preferred precoder out of the different precoders; and
use the preferred precoder for transmitting the uplink reference signal to the radio network node in a beamformed manner.

13. The wireless device according to claim 9, wherein the processing circuitry is configured to:
transmit the uplink reference signal without using a precoder;
receive a response from the radio network node indicating a preferred precoder; and
use the preferred precoder for transmitting the uplink reference signal to the radio network node in a beamformed manner.

14. The wireless device according to claim 9, wherein the processing circuitry is configured to:
transmit the uplink reference signal a number of times using different precoders over different parts of a frequency spectrum;
receive a response from the radio network node indicating a preferred precoder out of the different precoders; and
use the preferred precoder for transmitting the uplink reference signal to the radio network node in a beamformed manner.

15. The wireless device according to claim 9, wherein the processing circuitry is configured to:
select a precoder to beamform the uplink reference signal; and
use the selected precoder for transmitting the uplink reference signal to the radio network node in a beamformed manner.

16. The wireless device according to claim 15, wherein the processing circuitry is configured to select the precoder to use from among a number of possible precoders in consideration of at least one of: a previous precoder selection by the wireless device, an angle of arrival of a signal received from the radio network node, and, at least in cases where the wireless device has an active uplink session, which precoder is used for Demodulation Reference Signal (DMRS) transmission.

* * * * *